United States Patent [19]

Brown

[11] Patent Number: 4,621,257
[45] Date of Patent: Nov. 4, 1986

[54] VIDEO DISPLAY TOUCH DETECTION DIGITIZER

[75] Inventor: Earl F. Brown, Piscataway, N.J.

[73] Assignee: AT&T Bell Laboratories, Murray Hill, N.J.

[21] Appl. No.: 523,000

[22] Filed: Aug. 15, 1983

[51] Int. Cl.$^4$ .................. G08C 21/00; G08C 9/00
[52] U.S. Cl. .................. 340/365 P; 340/706; 340/712
[58] Field of Search .................. 340/706, 365 P, 712, 340/718; 367/907; 178/18, 30; 358/145, 142, 141

[56] References Cited

U.S. PATENT DOCUMENTS

| | | | |
|---|---|---|---|
| 3,673,327 | 6/1972 | Johnson et al. | 178/18 |
| 3,764,813 | 10/1973 | Clement et al. | 250/221 R |
| 3,775,560 | 11/1973 | Ebeling et al. | 178/18 |
| 3,846,826 | 11/1974 | Mueller | 358/81 |
| 4,177,354 | 12/1979 | Mathews | 178/18 |
| 4,180,702 | 12/1979 | Sick et al. | 250/227 |
| 4,205,304 | 5/1980 | Moore | 340/365 P |
| 4,247,767 | 1/1981 | O'Brien et al. | 340/365 P |
| 4,346,376 | 8/1982 | Mallos | 340/712 |
| 4,459,476 | 7/1984 | Weissmueller et al. | 340/365 P |
| 4,517,559 | 5/1985 | Deitch et al. | 340/365 P |

FOREIGN PATENT DOCUMENTS

| | | | |
|---|---|---|---|
| 2486267 | 12/1980 | France. | |
| 54-17507 | 8/1980 | Japan | 340/712 |
| 2082427 | 5/1981 | United Kingdom. | |

OTHER PUBLICATIONS

Bird, Digilux Touch Sensitive Panel, International Conference on Displays for Man-Machine Systems, Lancaster, England, 4-7-77, pp. 28-30.

IBM Technical Disclosure Bulletin, vol. 24, No. 6, Nov. 1981, by R. H. Harris, Optical Overlay Input Device for a Cathode Ray Tube, 1 dwg., 2 pages specs.

2421 Radio Fernsehen Elektronik, vol. 32 (1983) Mar., No. 3, pp. 147-149, Cursor Positioning with a Light Pen, by Klaus Engelman of East Berlin, GDR.

Primary Examiner—James L. Rowland
Assistant Examiner—T. Rittmaster
Attorney, Agent, or Firm—John A. Caccuro

[57] ABSTRACT

A video display touch detection digitizer for generating the coordinate position when the video display is touched. The light signals for the X and Y coordinate array are generated from the raster scan signals of the video display during selected periods of the vertical and horizontal blanking intervals. Vertical and horizontal mirrors reflect, respectively, the resulting row and columns of light signals across the screen of the video display where other mirrors reflect the signals to, respectively, row and column signal detectors. Control circuitry detects the resulting interruption in the rows and columns of light signals when the screen of the video display is touched and generates signals representing the touch coordinates.

12 Claims, 8 Drawing Figures

VIDEO DISPLAY TOUCH DETECTION DIGITIZER

TECHNICAL FIELD

This invention relates to apparatus for determining the coordinate location of a surface contact of a cathode ray tube (CRT) and, more particularly, to a touch detection apparatus which utilizes the synchronized light source of the CRT.

BACKGROUND OF THE INVENTION

Modern video displays, such as interactive graphics stations, enable the operator or user to perform certain operations by selecting functions from a displayed menu of possible choices. At an interactive graphics station, user controlled functions typically involve selecting a system operating capability from a menu and then selecting the location on the display image where the operation is to be carried out. While the selection of the operation from the menu typically requires only a low resolution touch detection apparatus, the selection of the location on the image at which to perform the operation often requires a high resolution touch detector or digitizer. Existing digitizers which allow the user to select the X and Y coordinates either use high resolution off-the-screen digitizers or low resolution on-the-screen devices. The off-the-screen digitizer is undesirable since the user cannot work directly with the displayed image. The on-the-screen devices typically are touch sensitive devices where the resolution is limited by the resolution of the touch detection screen matrix or the pointer or finger used to touch the screen. What is desired is an on-the-screen device having the high resolution of off-the-screen digitizers.

SUMMARY OF THE INVENTION

The present video display touch detection digitizer solves the existing problems by providing an on-the-screen digitizer where a user can work directly on the image using either his or her finger or a pointer and, secondly, providing a resolution which is limited by the resolution of the display device.

According to the present invention, during the vertical blanking period, selected line scanning signals of the video display (CRT) are unblanked and a row of picture element (pel) sized dots of light are generated. Additionally, during the normal horizontal blanking period a column of pel-sized video dots are formed by unblanking the video signal and generating a column of pel sized dots, one for each scan line of the display. The row and column of lighted pel-sized light sources or video dots are reflected by mirrors across the face of the display forming, respectively, an X and Y coordinate matrix of light beams which are then reflected, respectively, to an X position and Y position detector. Control circuitry detects and calculates the X and Y coordinate location of the centroid of a pointer or a finger which interrupts the light beams and outputs an appropriate address signal in response thereto. A cursor generator receives this address signal and provides a cursor on the CRT display at the X and Y coordinates of the touch location.

BRIEF DESCRIPTION OF THE DRAWING

The detailed description of the invention will be more fully appreciated from the illustrative embodiment shown in the drawing in which.

DETAILED DESCRIPTION

Figure 1:
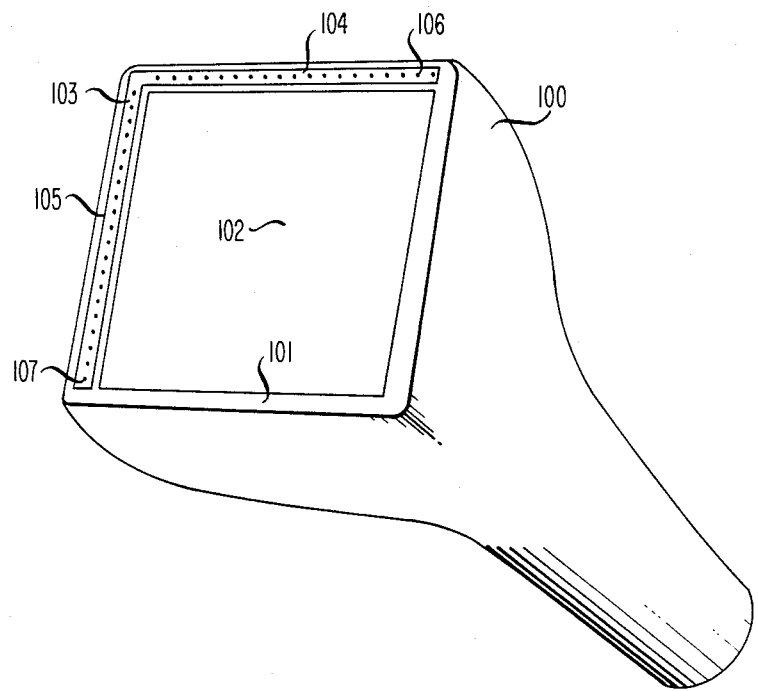
FIG. 1 shows a CRT illustrating the present invention.

Shown in FIG. 1 is CRT 100 arranged in a standard manner such that an electron beam from an electron gun (not shown) impinge upon a phosphorescent coating on the inner surface of the display screen or face 101 of the CRT in a raster scan pattern, sequentially line by line from top to bottom. As the electrons hit the phosphorescent inner surface, the screen 101 of CRT 100 glows. Illustratively, screen 101 and display area 102 of CRT 100 are shown as having a rectangular shape herein.

The screen 101 of CRT 100 is divided into two display areas 102 and 103. Typically, a bezel covers all but the display area 102 of the screen 101 of CRT 100. Display area 102 is the image display area which typically uses a medium-short persistence phosphor. According to the present invention, a coordinate display area 103 is used to generate the light beams or signals used in detecting the X, Y coordinates when the image area 102 is touched. Coordinate display area 103 may use a short persistence phosphor whose decay time is less than the image pel time.

Illustratively, coordinate display area 103 is further divided into areas or sections 104 and 105. Section 104 generates the row of discrete light sources or video dots 105 used in detecting the X coordinate of display area 102. During the normal vertical blanking period, the video signal is unblanked and a row of dots 106 are generated in section 104, where the number of dots may be equal to the number of picture elements (pels)/line in the image display area 102. Section 105 generates the discrete light signals used in detecting the Y coordinate of display area 102. During the normal horizontal blanking period, the video signal is unblanked for about one pel period and a column of video dots 107 are generated in section 105, where one dot may be generated for each horizontal line in the image display area 102.

As shown in FIG. 1, when a resolution of less than 1 pel is desired, the number of dots in row 106 and column 107 are less than the number of pels/line or number of video scan lines, respectively. However, when a resolution of one pel is desired, each pel in the image display area 102 is defined by a dot of light (one per pel) determining its X coordinate and a dot of light (one per scan line) determining its Y coordinate.

Even though display area 104 may use a short persistence phosphor, once a dot in row 106 is illuminated by the scanning electron beam, it is likely that the time constant of the phosphor persistence will cause that dot to glow for a while after the scanning electron beam has moved to the next dot in row 106. Since the ability to detect when a particular area of the display has been touched is enhanced when only one dot at a time is illuminated, the arrangements of dots shown in FIG. 2 would improve detection.

Figure 2:
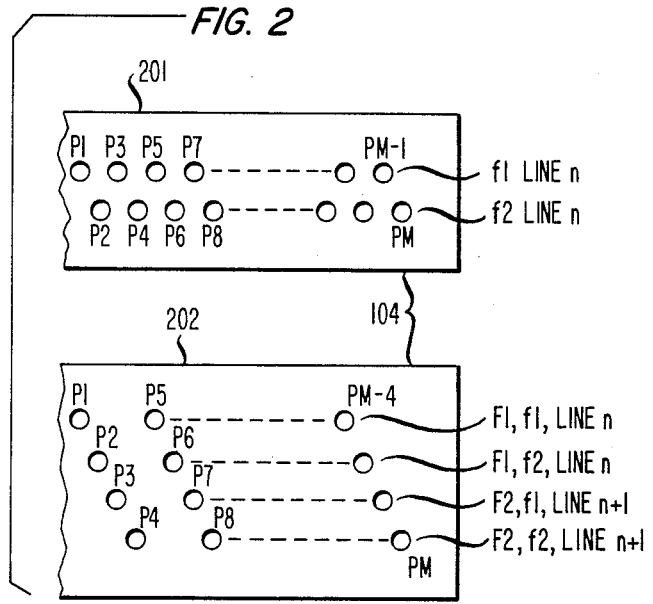
FIG. 2 shows various possible dot generating arrangements for use with the present invention.

Shown in FIG. 2 are two dot arrangements, 201 and 202, for section 104 using 2:1 interlaced raster scanning. Dot arrangement 201 uses dots which alternate between field 1 (f1) line n and field 2 (f2) line n. In 201, the odd pels (P1, P3, P5, etc.) light dots are generated first during field f1 line n, while the even pels (P2, P4, P6, etc.) light dots are generated during field f2 line n. Thus, the elapsed time between the illumination dots on the same line, e.g., pel P3 and pel P1 is two pel times rather than one pel time, when all the dots are on the same frame and line number. Hence, the effects of the persistence of the phosphor on touch detection accuracy is reduced. The result is that touch detection accuracy is enhanced or that the same touch detection accuracy can be had with phosphor having a time constant twice as long. Shown in 202 is another possible dot arrangement where the dot for every pel in the display, P1–PM, is generated alternately on frame F1 field f1 line n, frame F1 field f2 line n, frame F2 field f1 line n+1 and frame F2 field f2 line n+1. Since there are four pel times between dots on the same frame and line, there is an effective reduction of the persistence time constant of the phosphor by about a factor of four. Obviously, the techniques described above can be utilized to generate lines of dots on successive frames rather than on successive fields of the display. Note, since there is a scan line time period between the generation of each dot in the column of dots 107, the utilization of dot arrangements similar to those discussed above are typically not required for section 105.

Figure 3:
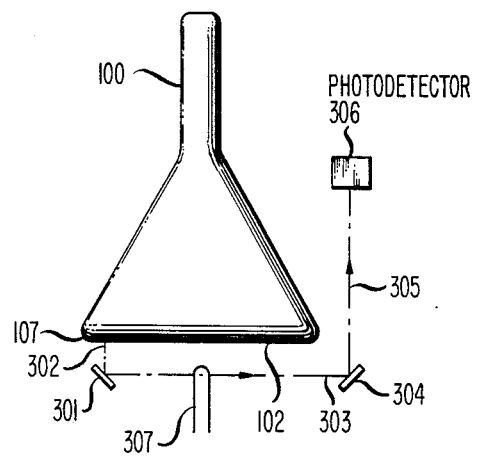
FIG. 3 shows a top view of apparatus for providing optical reflection and collection of the light beams or signals generated by the CRT of FIG. 1.

FIG. 3 shows a top view of the optical apparatus and photodetector layout for detecting the Y coordinate of the image display area 102. The layout for detecting the X coordinate is identical except that it is rotated 90 degrees with respect to the layout for the Y coordinate.

In one embodiment, a front surface mounted light deflector or mirror 301 is placed in front of the column of Y coordinate dots 107 and angled to deflect the light beams 302 generated by dots 107 across display area 102 of CRT 100 as illustrated by the dashed lines 303. The resulting row beams of light, 303, crossing the screen of CRT 100 are collected and focused, 305, by a parabolic reflector 304 or equivalent optical apparatus onto the Y coordinate photodetector 306. This optical apparatus layout provides a means for generating rows of scanning light beams across the image display area 102 of CRT 100, one for each horizontal scan line in the displayed picture. Obviously, if desired the disclosed apparatus can be arranged to deflect the light beams across any predetermined part of the image display area 102.

Figure 4:
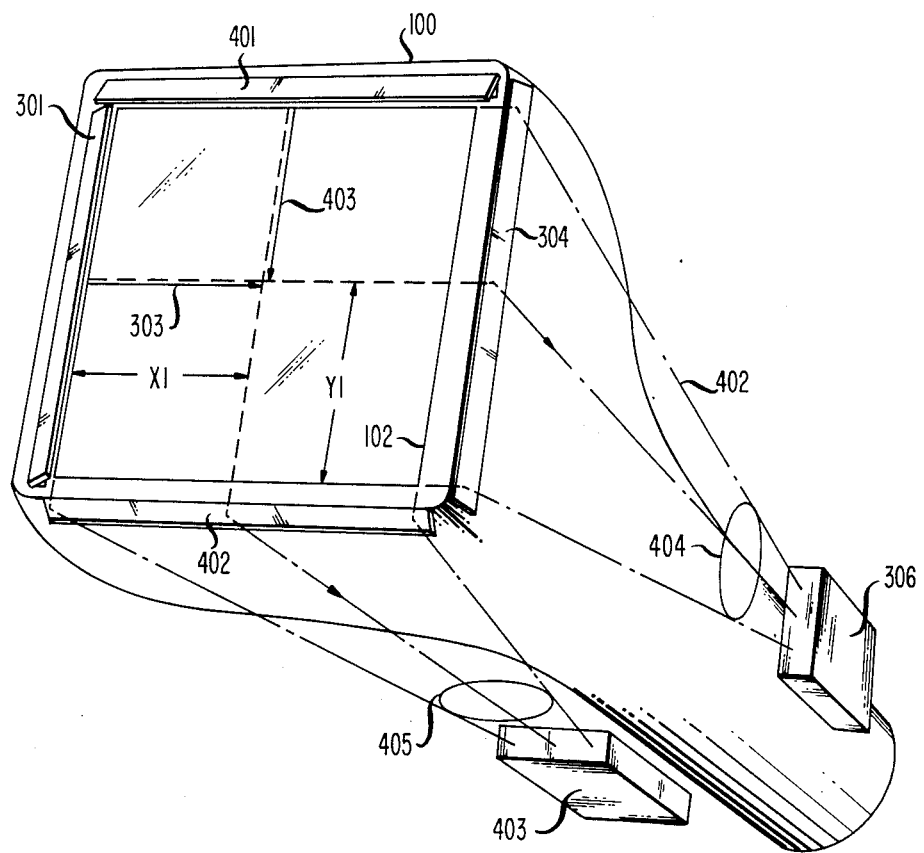
FIG. 4 shows a perspective view of the optical apparatus of the present invention in association with the CRT of FIG. 1.

Shown in FIG. 4 is a perspective view of CRT 100 with mirror 301, deflector 304 and photodetector 306. Also shown in FIG. 4 is an equivalent optical apparatus layout, including front surface mirror 401 for deflecting light beams generated by the row of X coordinate dots, parabolic reflector 402, and photodetector 403 for detecting the columns of scanning light beams which cross display area 102. It is contemplated that other light collecting means, e.g., multiple photodetector means, could be appropriately positioned to obviate the need for parabolic reflectors 304 and 402.

With joint reference to FIG. 3 and 4, if a finger or pointer object, e.g., 307 is used to select or point to a location X1, Y1 on display, 102, the resulting interruption of the beams of light, e.g., 303 and 403, at the selected location X1, Y1 is detected at photodetectors 306 and 403. This interruption of light is processed by circuitry, discussed in subsequent paragraphs, to determine the X and Y coordinates of the pel selected on the display (or the centroid if the pointer covered multiple pels on the display) by pointer 307. Note, since all the row scanning beams of light are focussed 404 onto one photodetector 306 and all the column scanning beams of light are focused 405 onto one photodetector 403, the processing circuitry requires the scan timing signals of CRT 100 to determine the exact row(s) and column(s) of light beams interrupted by pointer 307.

Figure 5:
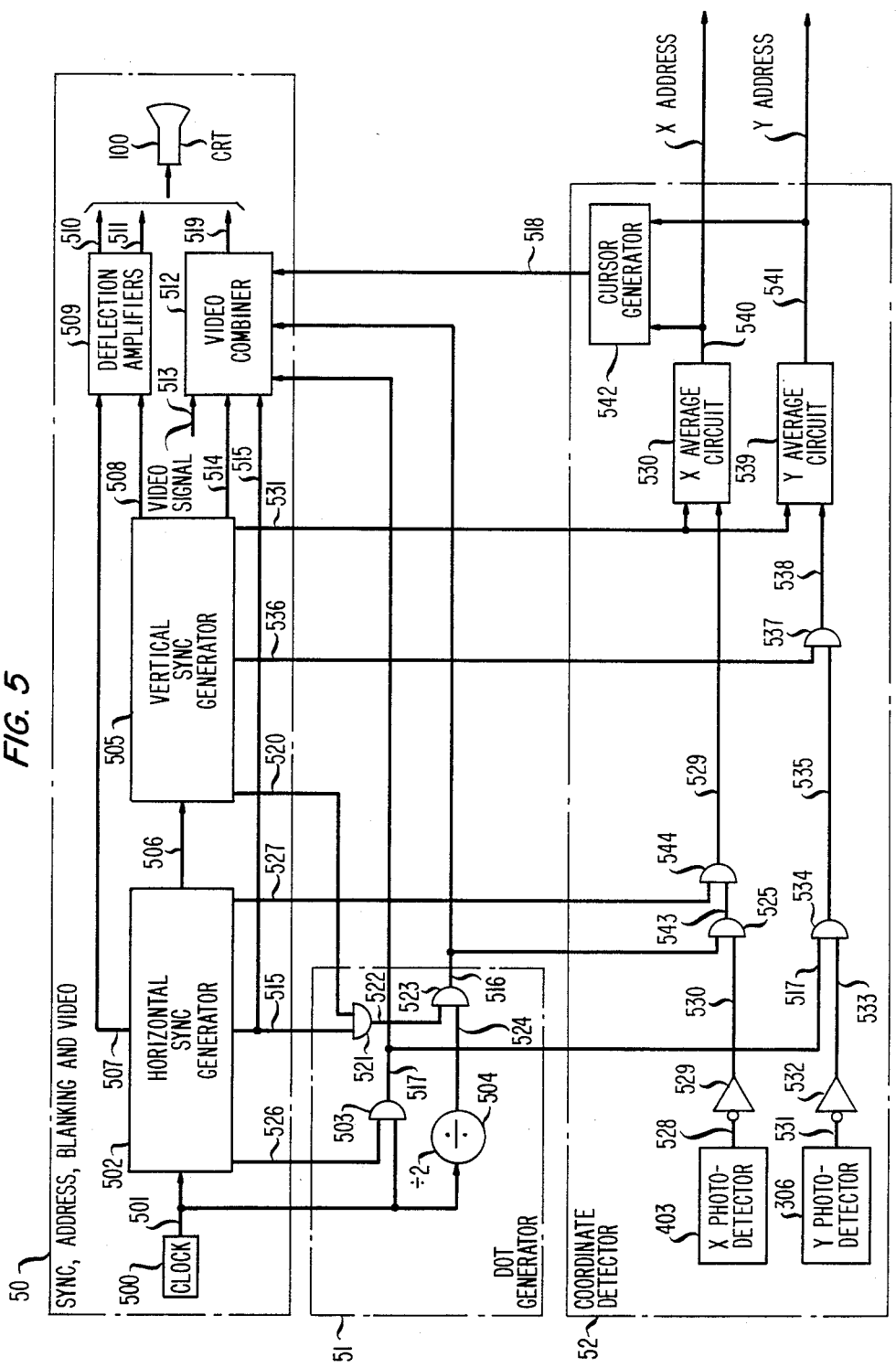
FIG. 5 shows the video control and signal processing circuit of the present invention.

Shown in FIG. 5 is the control and signal processing circuits of the present invention. These circuits includes sync, address, blanking and video circuits 50; dot generator 51; and coordinate detector 52. Illustratively, in the following description the CRT is assumed to operate at the standard television interlaced field format.

In video circuit 50, the standard system clock 500 generates a clock signal at the pel rate, which is applied over lead 501 to horizontal sync generator 502, AND gate 503, and divide by two counter circuit 504.

Horizontal sync generator 502 and vertical sync generator 505 utilize well known counting circuits to generate X and Y coordinate address information as well as the standard synchronization signals used for cameras and video display devices. Lead 506 supplies vertical sync generator 505 with a 2X horizontal pulse from the horizontal sync generator 502 to provide the arrangement or digitizer system with standard 2:1 interlace. Lead 507 from horizontal sync generator 502 and lead 508 from vertical sync generator 505 supply well known deflection amplifiers 509 with standard drive pulses to generate scan or sweep signals for CRT 100. The horizontal sweep signals on lead 510 and the vertical sweep signal 511 are applied to the corresponding deflection yokes of CRT 100.

Video combiner 512 receives standard baseband video signals on lead 513, standard vertical blanking signals on lead 514, standard horizontal blanking signals on lead 515, the inventive row of dot signals on lead 516, the inventive column of dot signals on lead 517 and a cursor signal on lead 518. These signals are combined, using standard techniques, to generate a composite video signal on lead 519 which is applied to CRT 100. These combined signals cause CRT 100 to display the usual video signal in image display area 102, and to display a row of dots in area 104 and a column of dots in area 105 of the conventionally blanked areas of the screen.

Figure 6:
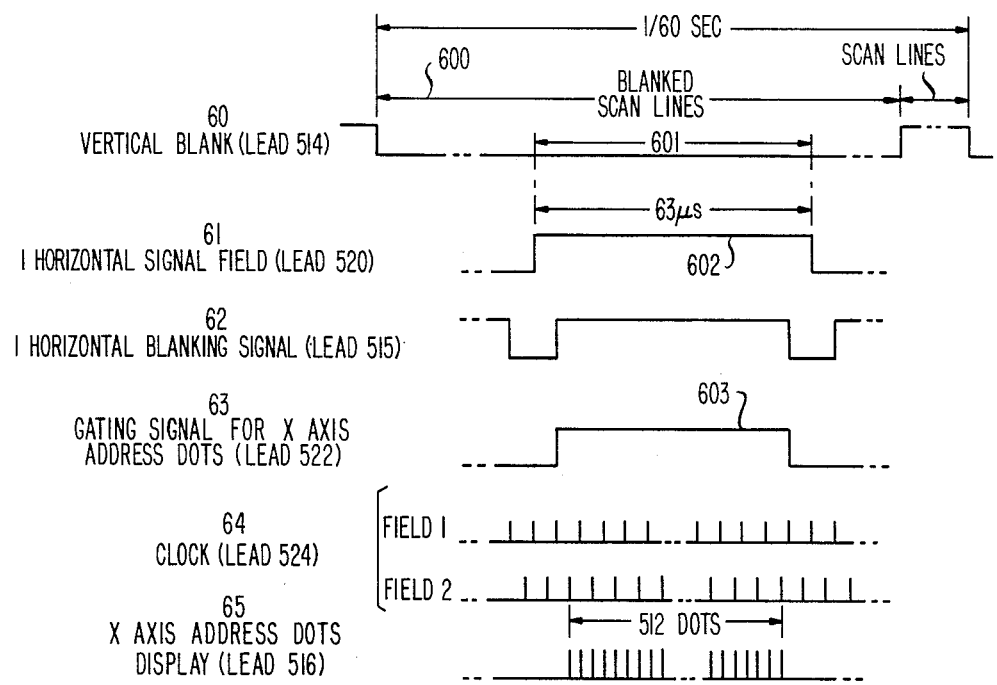
FIG. 6 shows the waveforms useful in describing the generation of a row of video dots used for horizontal address detection.

The displayed row of dots (i.e., 201 of FIG. 2) is generated from signals from dot generator 51. With joint reference to FIG. 5 and 6, vertical sync generator 505 selects one horizontal scan line period per field, 601 of waveform 60, near the end of its normal blanking period, 600, and outputs on lead 520 to one input of AND gate 521 a positive pulse, waveform 61, for the 63 μsec duration of that horizontal scan line period.

Horizontal sync generator 502 supplies its blanking signal (waveform 62), which is high during the active display time 602, on lead 515 to the other input of AND gate 521. The output, lead 522, of AND gate 521 which is high during the active display time, 603, of one horizontal scan period of a field, waveform 63, is applied to AND gate 523. This signal gates the row of dot signals used in determining the X coordinate or horizontal address. This input 522 in combination with the divided by two clock signal, waveform 64 on lead 524, causes AND gate 523 to output one line of signals at one-half the pel rate on lead 516. As shown in waveform 64, the signals for one-half of the row of dots are generated in each field, F1 and F2, for a total of 512 dots/frame for a standard broadcast video picture. Obviously, if a half horizontal detection resolution is desired, such as shown in 106 of FIG. 1, only the field 1 or field 2 signal of waveform 64 need be used.

The signals for 2 fields on lead 516, as shown in waveform 65, is applied to video combiner 512 and AND gate 525. Video combiner 513 generates the signals which result in a display of a row of dots on the screen of the CRT. As noted, when a lower touch detection resolution is desired, dot generator 51 can be arranged to provide dots at less than the pel rate.

Figure 7:
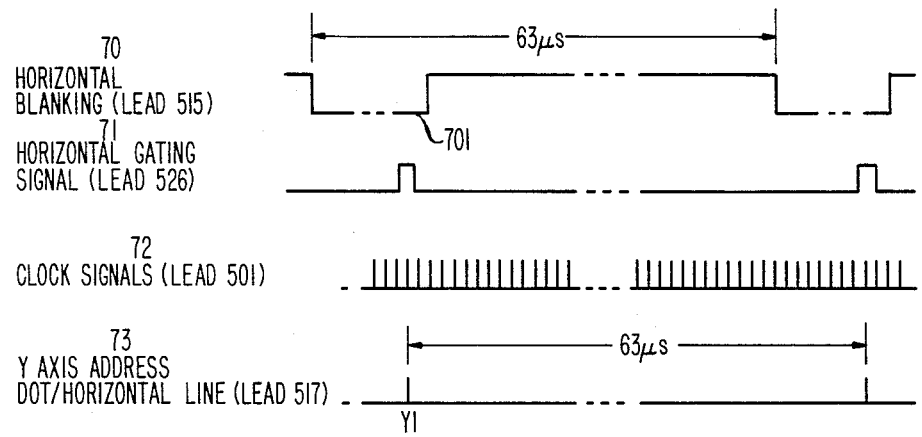
FIG. 7 shows the waveforms useful in describing the generation of a column of video dots used for vertical address detection.

The displayed column of dots (i.e., 107 of FIG. 1) is also generated from signals from dot generator 51. With joint reference to FIG. 5 and the waveforms of FIG. 7, horizontal sync generator 502 generates, in a standard manner, a signal 526, which is less than the width of two clock periods, waveform 71, at the trailing edge of the normally blanked segment of the horizontal scan signals, 701 of waveform 70. This signal is applied on lead 526 to AND gate 503. This signal in combination with the clock pulses 501, waveform 72, on lead 501 causes AND gate 503 to generate a positive pulse signal on lead 517 which is one pel time wide each horizontal scan line period of each frame as shown by waveform 73. The signal on lead 517 is applied to video combiner 512 which generates a signal to produce a column of dots, one per scan line on the CRT. This column of dots provides Y coordinate or vertical address information. The signal on lead 517 is also applied to AND gate 534 in the detector circuit 52. Obviously, if a lower touch detection resolution is desired, dot generator 51 can be arranged to provide less than one dot per horizontal scan line (e.g., one dot for every two scan lines, etc.).

Figure 8:
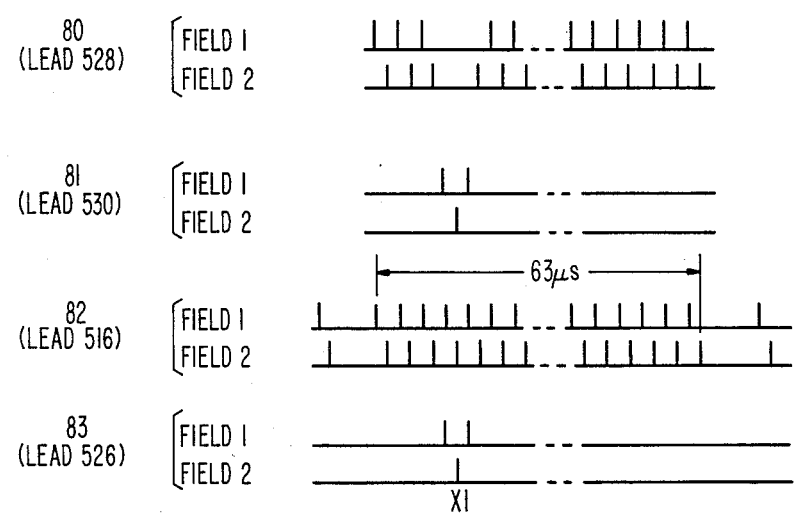
FIG. 8 shows the waveforms useful in describing the detection of interruption of light beams by the video control and signal processing circuit of FIG. 5.

Coordinate detector 52 determines both the X and Y coordinates of the display area touched by a finger or pointer. With joint reference to FIG. 4, FIG. 5 and the waveforms of FIG. 8, the determination of the X-axis touch coordinate is desired. The X axis photodetector 403 generates on lead 528 a string of logic 1s, one for each pel of a horizontal scan line of a frame, waveform 80, if the light beam path across the face or screen of CRT 100 is not interrupted. When the light path is interrupted, the absence of light on X-axis photodetector 403 causes one or more logic 0s to appear on output lead 528 (depending on the size of the point or finger, 307 of FIG. 3). The logic 0s on lead 528 are converted to logic 1s by inverter 529 and appear as waveform 81 on output lead 530. Lead 530 is ANDED with row dot signals on lead 516, waveform 82, to produce logic 1s, waveform 83, on lead 543 of AND gate 525. The logic 1 signals on lead 543 are gated by AND gate 544 to lead 529 using the horizontal blanking period signal on lead 527. Lead 529 applies the logic 1s, each representing an X coordinate, X1, or pointer 307, to the input of the X averaging circuit 530, which determines or calculates the average X coordinate or address. The average or centroid of the X address (X1 of waveform 83) is calculated because the size of point 307 will probably block the light coming from several dots. The X averaging circuit 530 is reset once each frame time by a pulse arriving on lead 531 from vertical sync generator 505.

The Y-axis touch coordinate determination and calculation are processed in the same manner as the X-axis address. Thus, Y-axis photodetector 306 generates on lead 531 a string of logic 1s, one for each horizontal scan line, as long as light is received and, accordingly, generates one or more logic 0s when the light is interrupted. Output 531 from Y-axis photodetector 403 is inverted in inverter 532 and gated with the column dot signals on lead 517 in AND gate 534. The output 535 of AND gate 534 is gated in AND gate 537 with a vertical blanking interval signal on lead 536. The output 538 of AND gate 537 is applied to Y averaging circuit 539 which determines or calculates the average Y coordinate address. The Y averaging circuit 539 is reset once each frame from a signal on lead 531 from vertical sync generator 505.

The output of X averaging circuit 530 on lead 540 and the output of Y averaging circuit 539 on lead 541 are applied to a well known cursor generator 542, which generates a signal on lead 518 which is combined with other signals by the video combiner 512 to place a video dot or mark in the active display area 102 on CRT 100 to indicate the X1, Y1 coordinate location to which pointer 307 pointed. The X and Y coordinate or address signals on leads 540 and 541, respectively, may also be used by other circuitry in another part of the video system (not shown) to select a pel or parts of the picture for special processing.

What has been disclosed is merely illustrative of the present invention. Equivalent components and circuitry are well known which can replace the apparatus or devices shown and described herein. Thus, while the present invention was particularly described for use with a CRT, it is contemplated that the invention can be utilized with any raster scanned video display by implementing a coordinate display area equivalent to the one disclosed herein by utilizing the technology or the devices utilized to implement the associated image display area. Additionally, it is contemplated that the disclosed circuitry can be incorporated into and implemented as part of any system incorporating a scanned video display terminal. Hence, other arrangements can be implemented by those skilled in the art without departing from the spirit and scope of the present invention.

What is claimed is:

1. A video display for displaying light images generated by a raster scan signal, said video display comprising
   a video circuit for controlling said raster scan signals including
   means for generating a plurality of first signals wherein each first signal is associated with one or more picture elements of a horizontal scan line which occurs during a vertical blanking interval of said raster scan and
   means for generating a plurality of second signals wherein each second signal occurs during a horizontal blanking interval of said raster scan and is associated with one or more horizontal scan lines of a displayed light image; and a screen including an image display area for displaying light images in response to said raster scan signals and a coordinate display area for displaying discrete light sources in response to each of said first signals and said second signals.

2. The invention of claim 1 wherein said video display is a CRT and said coordinate display area of said screen is coated with a phosphorescent material having a shorter persistence time constant than a phosphorescent material coated on said image display area.

3. The video display of claim 1 wherein said video circuit further includes a video combiner means for generating said raster scan signal for display on said image display area, wherein said video combiner means blanks said raster scan signal during said vertical and horizontal blanking interval, wherein said video combiner means unblanks said raster scan signal during said vertical blanking interval in response to each of said plurality of first signals from said first generating means and wherein said video combiner means unblanks said raster scan signal during said horizontal blanking interval in response to each of said plurality of second signals from said second generating means.

4. The video display of claim 1 wherein said image display area is rectangular and said coordinate display area includes a first and a second section extending along two adjacent sides of said image display area for displaying discrete light sources in response to each of said first and said second signals, respectively.

5. The video display of claim 4 wherein said first signal generating means generates every $n^{th}$ signal of said plurality of first signals on each of n horizontal scan lines occurring during said vertical blanking interval thereby producing a display in said first section of said coordinate display area having n horizontal rows each containing one $n^{th}$ of the discrete light sources, where n is an integer greater than 1.

6. The video display of claim 4 including a first light deflecting means positioned in proximity to said first section of said coordinate display area for deflecting light from said discrete light sources therein across a predetermined part of said image display area of said screen, and a second light deflecting means positioned in proximity to said second section of said coordinate display area for deflecting light from said discrete light source therein across said predetermined part of said image display area of said screen.

7. The video display of claim 6 further including a first light detection means for receiving light deflected from said first light deflecting means and a second light detection means for receiving light deflected from said second light deflecting means.

8. The video display of claim 7 further including a third light deflecting means positioned to deflect light received from said first light deflecting means to said first light detecting means and a fourth light deflecting means positioned to reflect light received from said second light deflecting means to said second light detecting means.

9. The video display of claim 8 wherein said first light detecting means is a first photodetector, said third light deflecting means focuses the light received from said first light deflecting means onto said first photodetector, wherein said second light detecting means is a second photodetector and said fourth light deflecting means focuses the light received from said second light deflecting means onto said second photodetector.

10. The video display of claim 7 wherein said video circuit includes first determining means responsive to said first signals and an output from said first light detecting means for determining the X-axis location along a horizontal scan line of said predetermined part of said image display area at which an interruption of the light signal from said first light deflecting means is detected by said first light detecting means and second determining means responsive to said second signals and an output from said second light detecting means for determining the Y-axis location associated with one more horizontal scan lines of said predetermined part of said image display area at which an interruption of the light signal from said second light deflecting means is detected by said second light detecting means.

11. The video display of claim 10 wherein said first determining means includes means for calculating the average X-axis location of said predetermined part of said image display area at which the interruption of light signals from said first light deflecting device has occurred and said second determining means includes means for calculating the average Y-axis location of said predetermined part of said image display area at which the interruption of light signals from said second light deflecting device has occurred.

12. The video display of claim 11 wherein said video circuit includes means responsive to an output from said first determining means and an output from said second determining means for generating a cursor image on said image display area at the intersection location specified by said first determining means and said second determining means.

* * * * *